(12) United States Patent
Cianfichi, Jr.

(10) Patent No.: US 6,336,725 B1
(45) Date of Patent: Jan. 8, 2002

(54) TORUS IMAGE-PRODUCING KALEIDOSCOPE

(75) Inventor: Vincent P. Cianfichi, Jr., 102 Elmwood Dr., Moscow, PA (US) 18444

(73) Assignee: Vincent P. Cianfichi, Jr., Moscow, PA (US)

( * ) Notice: Subject to any disclaimer, the term of this patent is extended or adjusted under 35 U.S.C. 154(b) by 0 days.

(21) Appl. No.: 09/313,205

(22) Filed: May 19, 1999

Related U.S. Application Data

(60) Provisional application No. 60/086,136, filed on May 20, 1998.

(51) Int. Cl.[7] .......................... G02B 27/08; A63G 31/00
(52) U.S. Cl. .......................................... 359/616; 472/63
(58) Field of Search ................................. 359/616, 617, 359/850, 856, 857, 861; 472/63

(56) References Cited

U.S. PATENT DOCUMENTS

| | | | | |
|---|---|---|---|---|
| 2,360,298 A | | 10/1944 | Woodson | 359/616 |
| 2,452,363 A | * | 10/1948 | Flotron | 359/616 |
| 3,930,711 A | * | 1/1976 | Powell | 359/616 |
| 4,475,126 A | | 10/1984 | Akins | 348/832 |
| 5,020,870 A | | 6/1991 | Gray | 359/616 |
| 5,225,934 A | * | 7/1993 | Kroll | 359/616 |
| 5,475,532 A | | 12/1995 | Sandoval et al. | 359/616 |
| 5,757,548 A | * | 5/1998 | Shimonukai | 359/616 |
| 6,139,160 A | * | 10/2000 | Frucht | 359/850 |

* cited by examiner

Primary Examiner—Christopher E. Mahoney
(74) Attorney, Agent, or Firm—Jones, Tullar & Cooper, PC

(57) ABSTRACT

A kaleidoscopic torus image is produced in the interior of a reflector assembly which is generally wedge shaped and which includes three reflective surfaces. An object cell, in the form of a right circular cylinder, is positional partially within the interior of the reflector assembly and dividing one of the three reflective surfaces into two part reflective surfaces. The torus image appears as a three-dimensional image floating inside the reflector assembly.

14 Claims, 7 Drawing Sheets

TORUS IMAGE-PRODUCING KALEIDOSCOPE

The subject patent application claims the benefit of U.S. Provisional Application No. 60/086,136, which was filed on May 20, 1998. The disclosure of that provision patent application is hereby incorporated herein by reference.

FIELD OF THE INVENTION

The present invention is directed generally to a torus image-producing kaleidoscope. More specifically, the present invention is directed to a kaleidoscope capable of producing a kaleidoscopic image of three dimensions. Most particularly, the present invention is directed to a torus image-producing kaleidoscope which uses reflective elements cut with curved sections and joined together along straight lines to produce the three dimensional kaleidoscopic images. The reflective elements are utilized in conjunction with a three dimensional object cell to product the color and pattern element necessary to create the three dimensional toroidal kaleidoscopic image. A set of four reflective elements, or mirrors, cut and placed at exact angles with respect to each other, using a three dimensional object cell, provide the torus image-producing kaleidoscope.

DESCRIPTION OF THE PRIOR ART

The kaleidoscope is a device with a long and colorful history. In 1817 Sir David Brewster of Scotland was granted what is believed to be the first patent on a kaleidoscope. Sir Brewster coined the word "kaleidoscope" based on a Greek translation of: beautiful+a form+to see. This translation has left its'interpretation open to the imagination and, in current times is used to refer to any beautiful form seen in an optical device, and not limiting the interpretation to a specific device or arrangement. Brewster's device was a rather simple combination of two planar reflectors joined along an edge and fixed at an angle from each other. This early kaleidoscope created a number of reflections of a viewing object, rendering beauty and relaxation for the user. The earliest kaleidoscopes were thought of as scientific instruments with applications for the fine and useful arts.

One of the earliest and most famous producers of kaleidoscopes in the United States was Charles G. Bush of Boston. Several patents were issued to Mr. Bush in the 1870's. These were directed to improvements to the earliest kaleidoscope invented by Sir David Brewster. Throughout the 1800's into the early 1900's kaleidoscopes were very popular, first as early scientific instruments, and then as children's toys.

During the past 20 years, the kaleidoscope has experienced a resurgence. Early devices are now viewed as highly desirable collectibles. A large number of makers, designers, inventors, innovators and artists have experimented with various designs and arrangements of reflecting surfaces or mirrors in an effort to create and to build kaleidoscopes which are used as gifts and collectibles. In 1988 Steven Gray introduced a kaleidoscope which used the early principles of Brewster's and Bush's ideas, as well as Mr. Gray's own creative input, to produce three dimensional effects of the image being reflected. In the past, only two dimensional imaging had been accomplished. Mr. Gray opened up an entirely new direction on how a kaleidoscope could be constructed and how kaleidoscopic images could be viewed. Mr. Gray took the two-dimensional realm of kaleidoscope imagery, and transformed it into a three-dimensional realm. In comparison, a two-dimensional image would be a segmented circle while a three dimensional object would be a segmented sphere. Since the debut of Mr. Gray's kaleidoscope, many others have sought to create other three dimensional objects for kaleidoscopes.

One limitation in most prior art kaleidoscopes is that the mirrors in the most early and simply constructed devices must be cut in straight lines, and must be joined along straight edges. In the prior art Gray device, the mirror system is a series of straight cuts on the mirror, connected in a converging manner, and producing a three dimensional kaleidoscopic image. In the early days of kaleidoscopes, the use of glass mirror systems which were cut along straight lines was the state of the art. Apparently at that time, no one thought or perhaps no one was able to cut a reflective surface along a curved line. Today, several makers of kaleidoscopes have cut reflective glass and plastics in curved sections to produce various kaleidoscopic images. However, these more recent devices still tend to utilize a two dimensional object cell, such as a section of a wheel or a disk. Alternatively, the object cell may be a tangential-contact view of a cylinder or a tangential-contact view of a sphere, such as a glass marble. While the resultant three dimensional imagery is a significant optical variation from Brewster's early kaleidoscope design, it still fails to produce a truly three dimensional kaleidoscopic image that simultaneously contains a robust, truly symmetrically-reflected image.

Many of the present kaleidoscopes and their associated imagery are objects of art and are found in many museums and private collections. These artistic endeavors are numerous, and have proven to be highly innovative. Many are constructed as limited edition art objects. Unfortunately many of these kaleidoscopes are not constructed using the sound basic rules outlined in Brewster's early works on the principles of the kaleidoscope. One of the most difficult principles not overcome in many of the modern designs involving three dimensional kaleidoscopic imagery, is that the object cell, and thus the associated objects to be viewed, does not come in close contact with the termination of the mirrors in the kaleidoscope. This, due to the nature of the optics of the kaleidoscope, results in a kaleidoscopic image that is not symmetrical. In other words, the reflected segments of the kaleidoscope image do not match up properly, and degrade the "robustness" of the image and decrease the symmetry. In addition, many of these high end art kaleidoscopes are sensitive to handling, and the majority of people can not enjoy the view these kaleidoscopes afford to offer.

In 1995 Juan Sandoval produced a kaleidoscope showing a variety of three dimensional geometric images. While robust and symmetrical, these images consist of cubes, octahedra, spheres, and other polyhedrons. While such devices have a place, there is also a need for a torus image-producing kaleidoscope that can be handled, examined, used and enjoyed without great fear that it will be damaged or destroyed. The enjoyment of kaleidoscopes requires that the image producing device be sufficiently strong and uncomplicated so that it will withstand the type of handling that a toy is apt to experience in the hands of a youthful user. Various ones of the prior art objects and collectibles have not been able to withstand such usage.

The prior art kaleidoscopes do not produce a robust and truly symmetrical three dimensional image using a device that is practical and durable. The torus image-producing kaleidoscope, in accordance with the present invention, accomplishes these desirable results. It is a significant improvement over the prior art devices, and certainly proves to be a natural succession to the addition of the currently existing three dimensional kaleidoscope image complexity.

SUMMARY OF THE INVENTION

It is an object of the present invention to produce a torus image-producing kaleidoscope.

Another object of the present invention is to provide a kaleidoscope capable of producing an image of three dimensions.

A further object of the present invention is to provide a torus image-producing kaleidoscope which uses reflective surfaces cut with curved sections and joined together along straight lines.

Yet another object of the present invention is to provide a torus image-producing kaleidoscope having a cylindrical object cell.

Still a further object of the present invention is to provide a kaleidoscope capable of producing multiple toroidal images.

Even yet another object of the present invention is to provide a torus image-producing kaleidoscope which is sturdy, durable and able to be mass-produced.

As will be discussed in detail in the description of the preferred embodiments, which is presented subsequently, the torus image-producing kaleidoscope in accordance with the present invention creates a unique kaleidoscopic image of three dimensions using mirrors cut with curved sections and then joined along traditional straight lines. The mirrors have sections that are cut as a semicircle or a part of a semicircle or as a curve or a section of a curve. A three dimensional object cell, perferably in the shape of a right cylinder, is used to produce the three dimensional kaleidoscope image. As opposed to prior art devices which have used traditional planar object cells, such as a section of a wheel or a disk, the three dimensional object cell of the present invention cooperates with the curved surfaces of the mirrors to create a robust, truly symmetrical three dimensional object in space. The object cell fits together with the reflector system; i.e. the several mirrors with the curved section cuts, in such a way that there is continuous contact between the object cell and the reflector edge surface. This continuous line contact between the object cell and the reflector surface allows, optically, a robust and truly symmetrical image, to the furthest extent possible in such an arrangement, to be produced.

In the torus image-producing kaleidoscope of the present invention, the image produced is that of a torus, or doughnut shape, which appears to be floating freely in space. This, in itself, has not been done before. The present invention also allows an image to be reflected over the surface of the torus. Reflections along both the lateral and longitudinal axis of the torus can be obtained by using the subject invention. The kaleidoscopic image provides the illusion that the torus in space is turning into or out-of itself This renders a moving kaleidoscopic image which is very stimulating, energetic and strongly dimensional.

The torus image-producing kaleidoscope in accordance with the present invention can be produced using reflective plastic as the reflector system and an object cell in the form of a cylindrical tube of plastic. The device is not fragile when made using these durable materials. While it can be constructed using a mirrored glass reflector system and a glass object cell, it does not depend on specific materials to form its three dimensional toriodal image. Thus the kaleidoscope in accordance with the present invention can be mass-produced and can be used and enjoyed by masses of people.

The torus image-producing kaleidoscope of the present invention overcomes the limitations of the prior art devices. It represents a substantial advance in the art to which it pertains.

BRIEF DESCRIPTION OF THE DRAWINGS

While the novel features of the torus image-producing kaleidoscope, in accordance with the present invention, are set forth with particularity in the appended claims, a full and complete understanding of the invention may be had by referring to the detailed description of the preferred embodiments, which is set forth hereinafter, and as illustrated in the accompanying drawings, in which:

DESCRIPTION OF THE PREFERRED EMBODIMENTS

Figure 1:
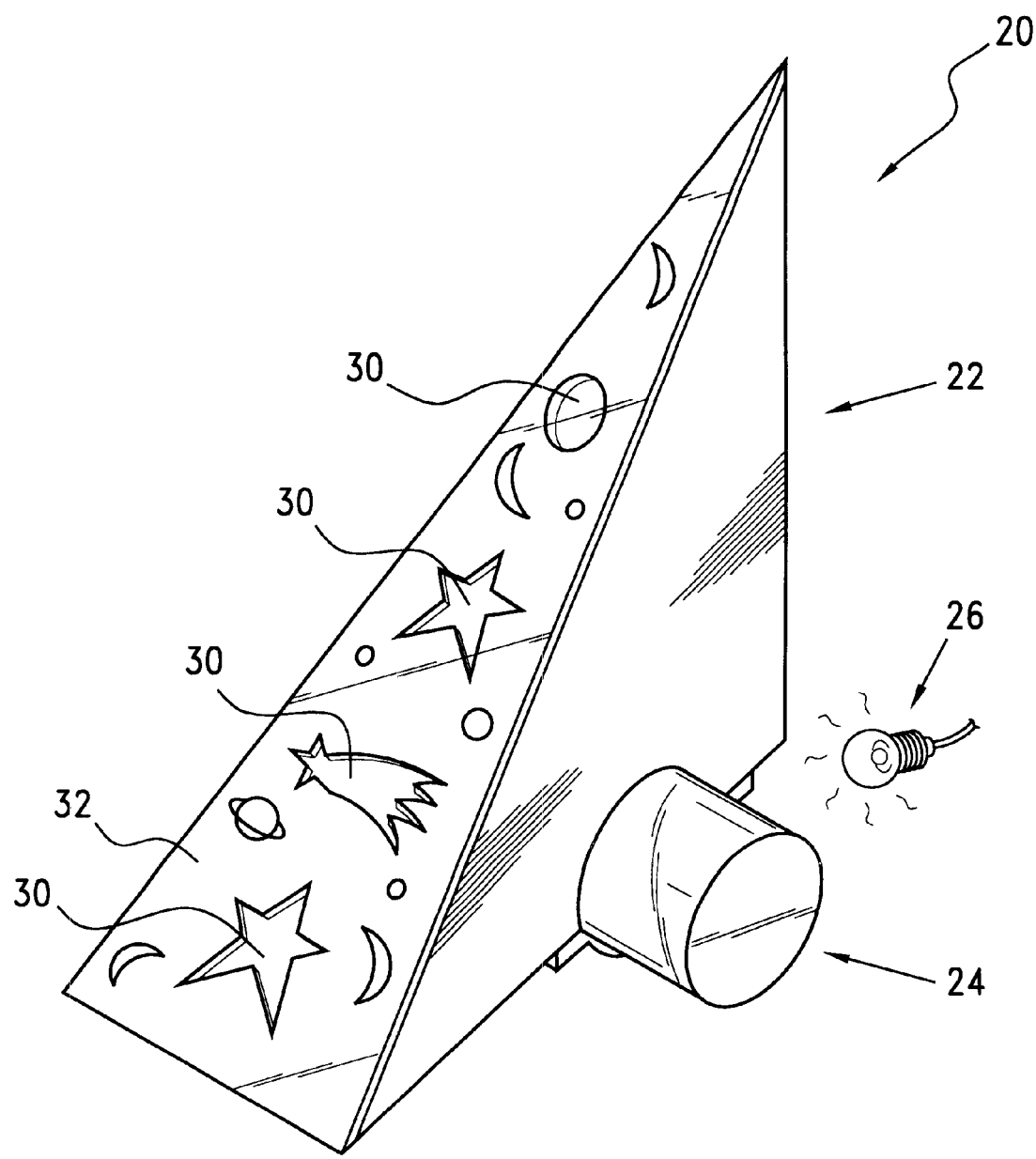
FIG. 1 is a perspective view of a torus-image producing kaleidoscope in accordance with the present invention.
Figure 10:
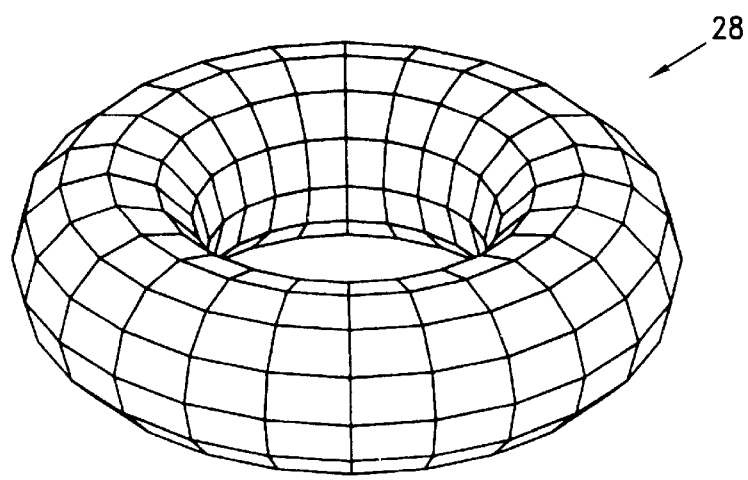
FIG. 10 is a depiction of a torus image generated by the kaleidoscope of FIG. 2.

Referring initially to FIG. 1, there may be seen, generally at 20, a first preferred embodiment of a torus image-producing kaleidoscope in accordance with the present invention. Kaleidoscope 20 is comprised generally of a reflector assembly 22 and an object cell 24. Although both will be described in detail shortly, the object cell, generally at 24, which is illuminated by a suitable light source, schematically illustrated at 26, is the source of the image which is shaped by the reflector assembly 22 to form a three dimensional appearing toroidal image, as seen generally at 28 in FIG. 10. The three dimensional toroidal image 28 appears to be free floating in the interior space of the reflector assembly 22 and can be viewed by a person who will look into the interior of the reflector assembly 22 through a viewing aperture 30 which is formed in a semi-transparent or opaque cover 32 for the reflector assembly 22. As seen in FIG. 1, there may be several such viewing apertures 30 spaced along the cover 32.

A torus is three dimensional shape, described as the shape of a doughnut, or a "ring". In H. S. M. Coxeter's 1969 book *Introduction to Geometry*, the torus is mathematically defined in the following equation:

$$(c - \sqrt{x^2+y^2})^2 + z^2 = \alpha^2$$

where c is the radius from the center of the hole to the center of the torus tube, and, α is the radius of the tube.

This equation is provided simply to show that the torus is an accepted shape in the field of mathematics. It is a defined shape, and exists under a well-understood basis to those persons trained in mathematics. For all practical purposes, the torus can be defined simply as a three dimensional ring shape. The surface of the torus is smooth and continuous. The lateral axis of the torus would be considered to be a line running through the center of the "tube" of the torus, in the shape of a circle. The longitudinal axis would be considered to be a straight line running through the center of the hole of the torus, perpendicular to the lateral axis.

Before discussing the structure and operation of the torus image-producing kaleidoscope of the subject invention further, it is important to note that the representations set forth in FIG. 1, and in other accompanying figures to be discussed in detail, is a representative or depiction of an operative device, but does not include possible external housings, support assemblies such as feet and the like which might be part of a kaleidoscope sold to the public. The device discussed herein and shown in the accompanying drawings is fully functional and very effectively produces a three dimensional torus image. However, it does not include the various adjuncts, such as casings, stands, object cell control knobs, internal-lighting switches and the like which might well be included in a commercial version. The nature of these is limited only by the needs of commercialization of the product. These commercializing details form no part of the present invention.

Returning again to FIG. 1, and as may also be seen quite clearly in FIGS. 2–6, the reflector assembly, generally at 22 of the torus image-producing kaleidoscope consists of first and second side reflectors 34 and 36, a primary bottom reflector 38, a secondary bottom reflector 40 and the cover 32. It will be understood that the cover 32 has been only generally depicted in various views of the kaleidoscope, such as FIGS. 2–6, and other figures to be discussed subsequently, for ease of illustration. The two side reflectors 34 and 36 and the bottom reflectors 38 and 40, together with the cover 32 form the reflector assembly generally at 22. As can be seen most clearly in FIGS. 1, 2 and 4, the reflector assembly 22 is generally wedge-shaped. Each of the side reflectors 34 and 36 is a right triangle having first and second sides 42 and 44 and a hypotenuse 46. The two sides 42 and 44 meet at a 90° angle and each side connects with the hypotenuse at a 45° angle. The two side reflectors 34 and 36 are converging in order to form the wedge shape discussed above. The second sides 44 of the two side reflectors 34 meet and form a common edge, called the seam edge 48. The two side reflectors 34 and 36 converge at an angle of between 10° and 30° so that a spacing distance between them converges toward the seam edge 48. This seam edge 48 is shown in the various drawings as being vertical. However, it will be understood that the depicted orientation of the reflector assembly 22 is only for ease of illustration. Spacial terms, such as left, right, vertical and horizontal are for convenience of discussion and do not indicate that the kaleidoscope 20 need be placed in a specific orientation to be operational.

The first or horizontal side 42 of each of the side reflectors 34 and 36 is provided, intermediate its ends, with a semi-circular aperture or cut-out 50. These two apertures 50 in the two side reflectors 34 and 36 are of the same size and are aligned with each other so that a line drawing through their respective centers would be perpendicular to the seam edge 48. These two semi-circular apertures 50 are sized to receive the object cell 24, which is preferably in the form of a right circular cylinder, as will be discussed in detail subsequently. The semi-circular apertures 50 are positioned along the first edges 42 of the respective first and second side reflectors 34 and 36 closer to the seam edge 48 than to the intersection of the first side 42 with the hypotenuse 46 of each of the side reflectors 34 and 36.

Figure 2:
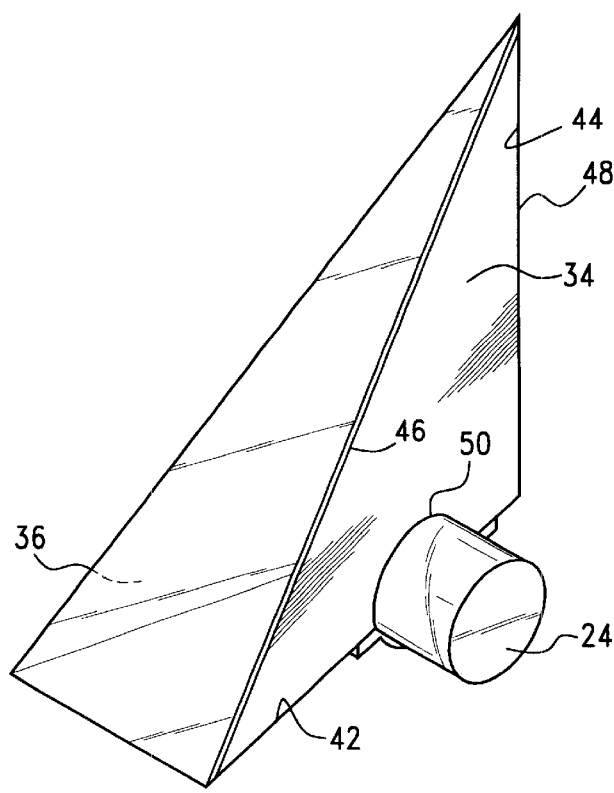
FIG. 2 is a perspective view generally similar to FIG. 1 of a first preferred embodiment of the kaleidoscope but with portions of the device omitted for ease of illustration.

The placement of the semi-circular apertures 50 in the first sides 42 of the side reflectors 34 and 36 requires that the primary bottom reflector 38 be generally trapezoidal, and that the secondary bottom reflector 40 be generally in the shape of an isosceles triangle. These two bottom reflectors are joined to the side reflectors along common edges, as seen in FIG. 2. The resultant shape is, as described above, a wedge which has its apex or point at the seam edge 48. The two bottom reflectors 38 and 40 are perpendicular to the planes of the side reflectors 34 and 36 and the edges of the side reflectors 34 and 36 and the edges of the primary and secondary bottom reflectors 38 and 40 meet at smooth edge seams. A minor base side 52 of the trapezoidal primary bottom reflector 38 opposite to this reflector's major base 54 does not extend beyond the edge defined by the juncture of the semi-circular cut-out or aperture 50 with the longer portion of the first side 42 of each side reflectors 34 and 36. Similarly, the base 56 of the isosceles triangle-shaped secondary bottom reflector 40 does not extend beyond the edge defined by the juncture of the aperture 50 and shorter portion of the first side 42 of each of the side reflectors 34 and 36. The resultant aperture in the base of the wedge-shaped reflector assembly 22 is sized to snugly receive the object cell 24, as will be discussed shortly.

The reflector assembly 22, as its name implies, has reflective surfaces. These are the interior surfaces of each of the two side reflectors 34 and 36, as well as the interior surfaces of the primary and the secondary bottom reflectors 38 and 40. The reflector surfaces can be formed in any suitable manner as is generally known in the art. All of the reflector elements can be made of glass with a mirrored coating. Since this would result in a fragile kaleidoscope, it is preferable that a more durable material, such as an acrylic plastic or the like, which has been coated with a suitable reflective coating, be used. Good success has been demonstrated using such reflectorized acrylic plastics that have had their semi-circular apertures 50 formed by laser cutting. It will however, be understood that the material used to make the side reflectors 34 and 36, as well as the primary and secondary bottom reflectors 38 and 40 can vary in accordance with the usage to which the resultant kaleidoscope will be subjected.

Again referring to FIGS. 1–6 the object cell, generally at 24 in accordance with the present invention, is generally in the form of a right circular cylinder. The diameter of the object cell 24 is selected to cooperate with the size of the semi-circular cut-outs or apertures 50 in the two side reflectors 34 and 36 so that the object cell 24 will be snugly, yet rotatably received in the apertures 50. As seen most clearly in FIGS. 3 and 6 a semi-cylindrical bracket 58 is used to hold the object cell 24 in place in the base of the reflector wedge assembly. The bracket 58 may be provided with axially extending attachment flanges 60 which are used to secure the bracket to the outer surfaces of the primary and secondary bottom reflectors 38 and 40, respectively. It will be understood that the object cell 24 is intended to fit into the space defined by the apertures 50, the previously described minor edge of the primary bottom reflector, the base of the secondary bottom reflector and the bracket 58. This fit should still allow the object cell 24 to be rotated and also to be slid axially, if desired. It is also within the scope of the subject invention to allow the substitution of one object cell for another. It may be desirable to use some type of a resilient seal or gasket around the edge of the semi-circular cut-outs 50 to accomplish the two objectives of snug fit and interchangeability of the object cell 24.

The torus image produced in the interior of the wedge-shaped reflector assembly 22 is the reflection of the object cell 24 which has been illuminated by the light source 26. If the object cell 24 were to be made of a solid clear material, with no imperfections, there would exist only the clear image of a torus. If the object cell is made of a colored semi-transparent plastic cylinder, for example, the torus image would be a solid colored torus of the color of the object cell. If the object cell is made of a semi-transparent plastic cylinder with brightly colored miniature space aliens, for example, embedded in it, the torus image will be formed with the kaleidoscopic reflections of these space aliens across its' surface. If the object cell is formed of a clear hollow tube in which a plurality of brightly colored objects, such as, but certainly not limited to, space aliens, suspended in a viscous fluid, such as a clear glycerin-type oil, the torus image will be formed with the kaleidoscopic reflection of these brightly colored objects which can move independently of each other as the object cell is rotated or is slid axially. In short, it is the color or colors of the material or materials in the object cell which defines the extent of the kaleidoscopic activity across the surface of the torus image produced by the kaleidoscope.

The light source 26 has been schematically depicted in FIG. 1 as a light bulb. It will be readily apparent that such a depiction is merely for purposes of illustration. In a functioning device, the light source 26 could be a bulb in a reflector, which is sized to fit onto an end of the object cell. Various other means, such as fiber optics and the like could also be used to provide a source of illumination for the object cell. The important idea is that the object cell is to be illuminated.

The cover 32 of the reflector assembly 22 is, as seen in FIG. 1, is provided with one or more viewing apertures 30. If the theme of the kaleidoscope is space travel or space ships, or a space-station kaleidoscope, for example, the apertures can be configured as stars, or other planetary bodies. The cover 32 is made of an opaque or of a semi-transparent material in a color that will compliment the desired visual effect. Suitable adornments can also be placed on the cover 32, as shown in FIG. 1. If more than one viewing aperture 30 is provided, the observer can view the torus image from a variety of locations with respect to the position of the torus image itself. Viewing the torus image from a variety of locations in this manner will allow the observer to see the torus image from different viewpoints, giving a vast sense of variety to the kaleidoscope. Binocular viewing of the torus image could be afforded by making the viewing aperture 30 large enough to accommodate the observer viewing the torus image with both eyes. This would provide a truly sensational perception of three dimensions in viewing the torus image. The viewing apertures 30 not being used can admit limited ambient light into the interior of the reflector assembly to provide an interesting visual effect in conjunction with the torus image. Other covers 32 and other viewing arrangements, possibly such as a sliding view port with an optically magnifying lense that can be moved from one viewing aperture to another are within the purview of the subject invention. These are again limited only by the creativity of the manufacturer and the vagaries of the market.

Figure 7:
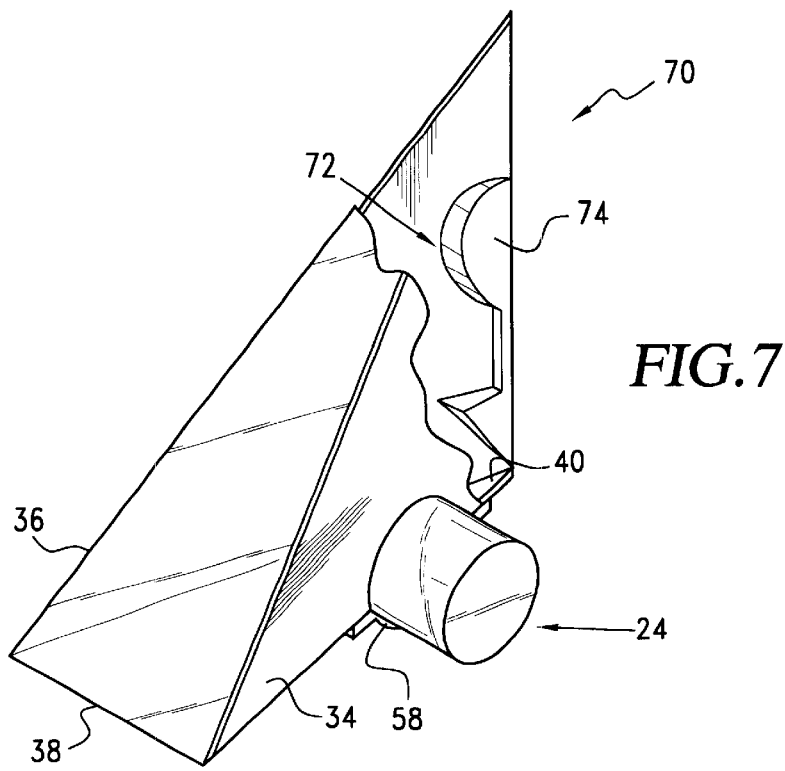
FIG. 7 is a perspective view of a second preferred embodiment of a kaleidoscope in accordance with the present invention.
Figure 8:
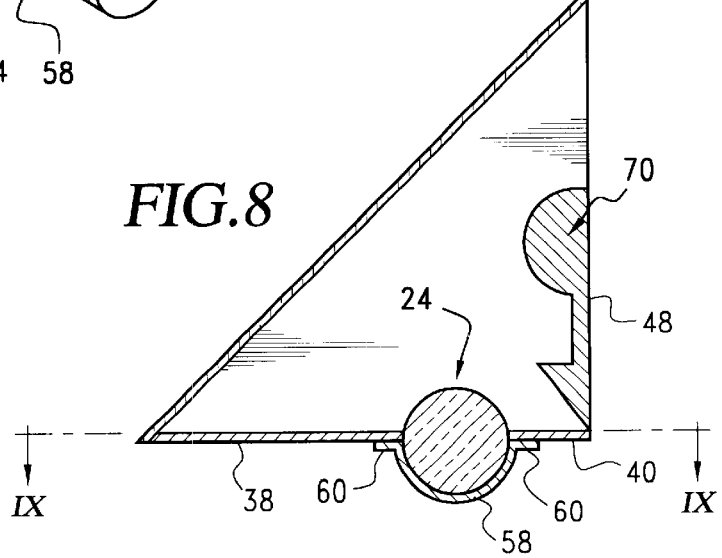
FIG. 8 is a sectional side elevation view of the kaleidoscope of FIG. 7.
Figure 9:
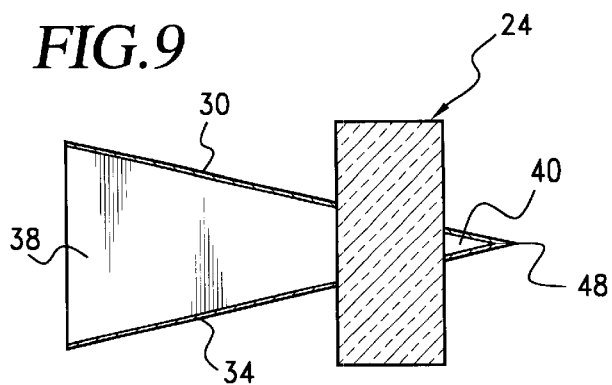
FIG. 9 is a sectional plan view of the kaleidoscope of FIGS. 2 and 7, taken along line IX—IX of FIG. 8.

Turning now to FIGS. 7, 8 and 9 there may be seen a second preferred embodiment of a torus image-producing kaleidoscope in accordance with the present invention, generally at 70. This second preferred embodiment of the kaleidoscope is essentially the same as the first embodiment discussed previously. However, in this second preferred embodiment, there is included a material wedge 72 that is placed within the interior of the reflector assembly. This material wedge 72 is complex in shape and has a cross-section which is triangular. The material wedge 72 has flat side surfaces 74 which will abut the inner surfaces of the first and second side reflectors 34 and 36 generally adjacent the seam edge 48. While one complex shape of a material wedge 72 is shown in FIGS. 7, and 8, it will be understood that many different material wedges 72 having any number of shapes, could be placed within the interior of the reflector assembly 22 adjacent the seam edge 48.

Figure 11:
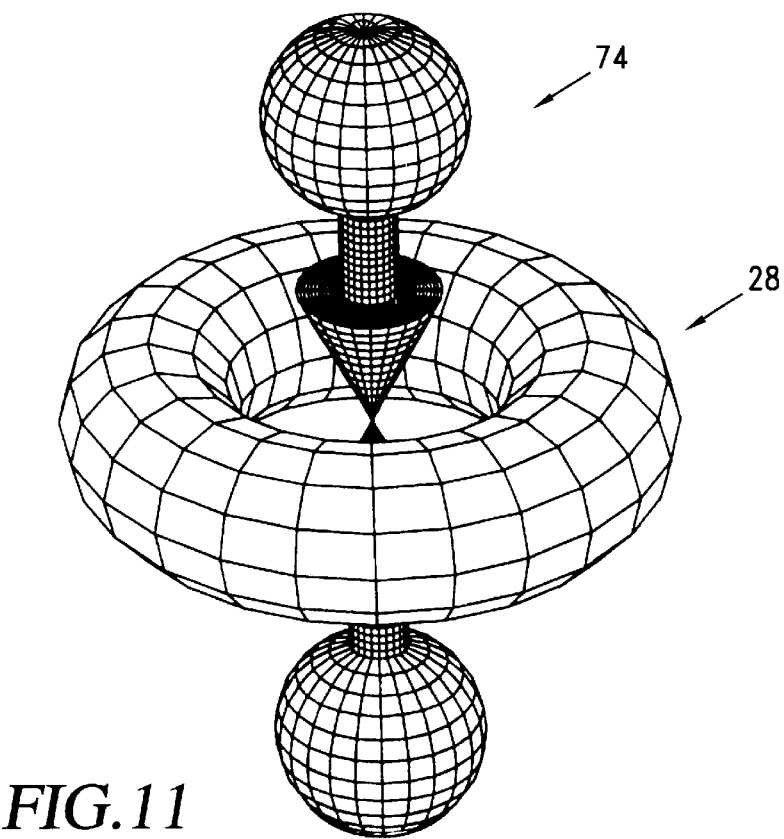
FIG. 11 is a depiction of a torus image generated by the kaleidoscope of FIGS. 7 and 8.

The material wedge 72 will be colored and shaped to carry on the scheme of the kaleidoscope conveyed by the object cell 24 and by the cover 32. For instance, if the space-station kaleidoscope theme discussed previously is to be used, the material wedge 72 can be shaped to generate an image that will complement the space-station kaleidoscope theme. As seen in FIG. 11, the placement of the material wedge 72 at the seam edge 48 of the reflector assembly 22 results in the generation of a 360° image that appears to be in the center of the torus image. Also, the material wedge 72 is reflected once about its point at the apex of the reflector assembly; i.e. the point of intersection of the seam edge 48 and the apex of the triangular secondary bottom reflector 40. The net result, in a space-station-themed kaleidoscope, is an image in which the material wedge image interacts with the toroidal image 28 to create a space-station, or spaceship type of image, with the kaleidoscopic effect moving across the surface of the toroidal part of the image.

Figures 12, 13:
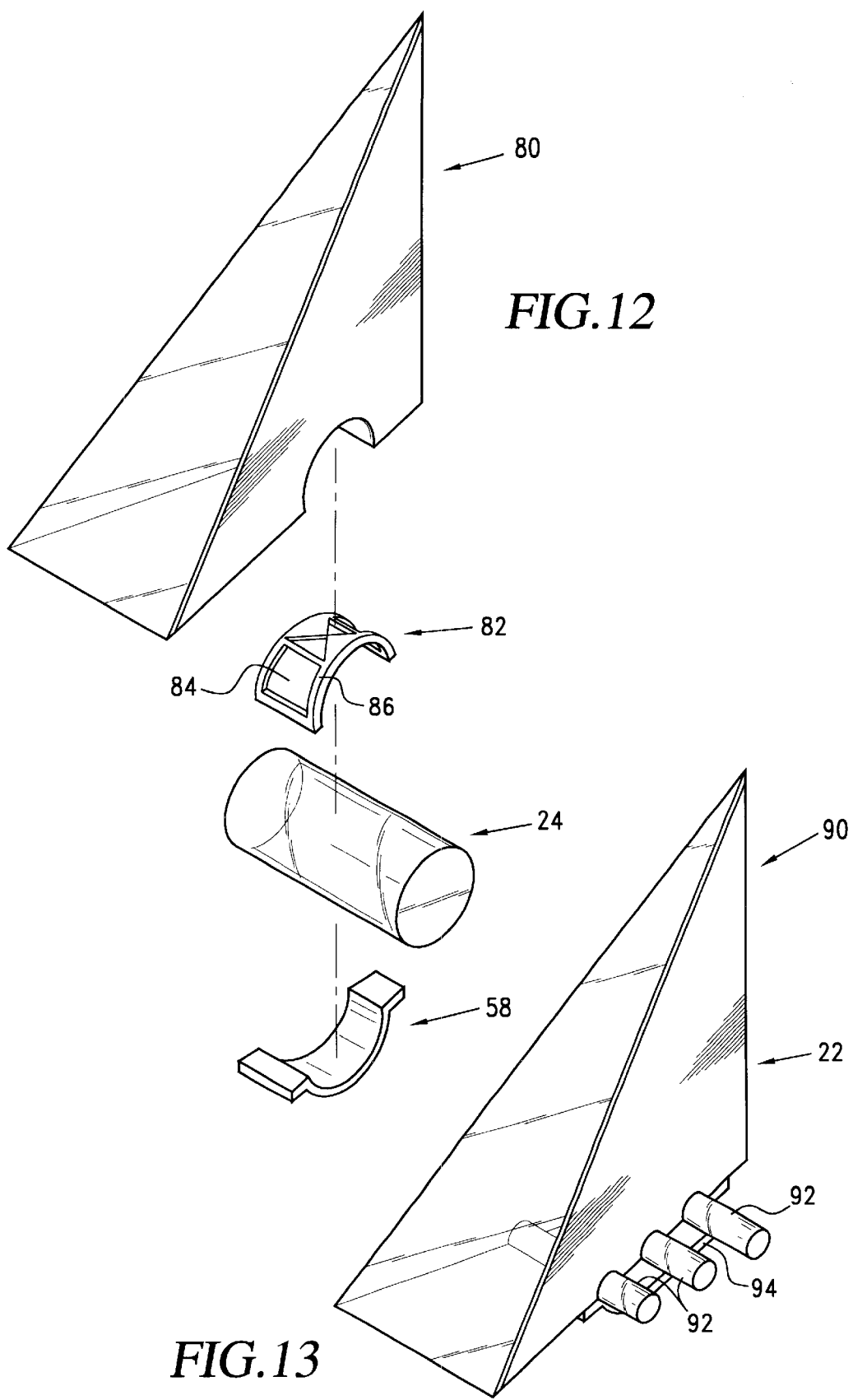
FIG. 12 is an exploded perspective view of a third preferred embodiment of a kaleidoscope in accordance with the present invention.
FIG. 13 is a perspective view of a fourth preferred embodiment of the kaleidoscope of the present invention.
Figure 14:
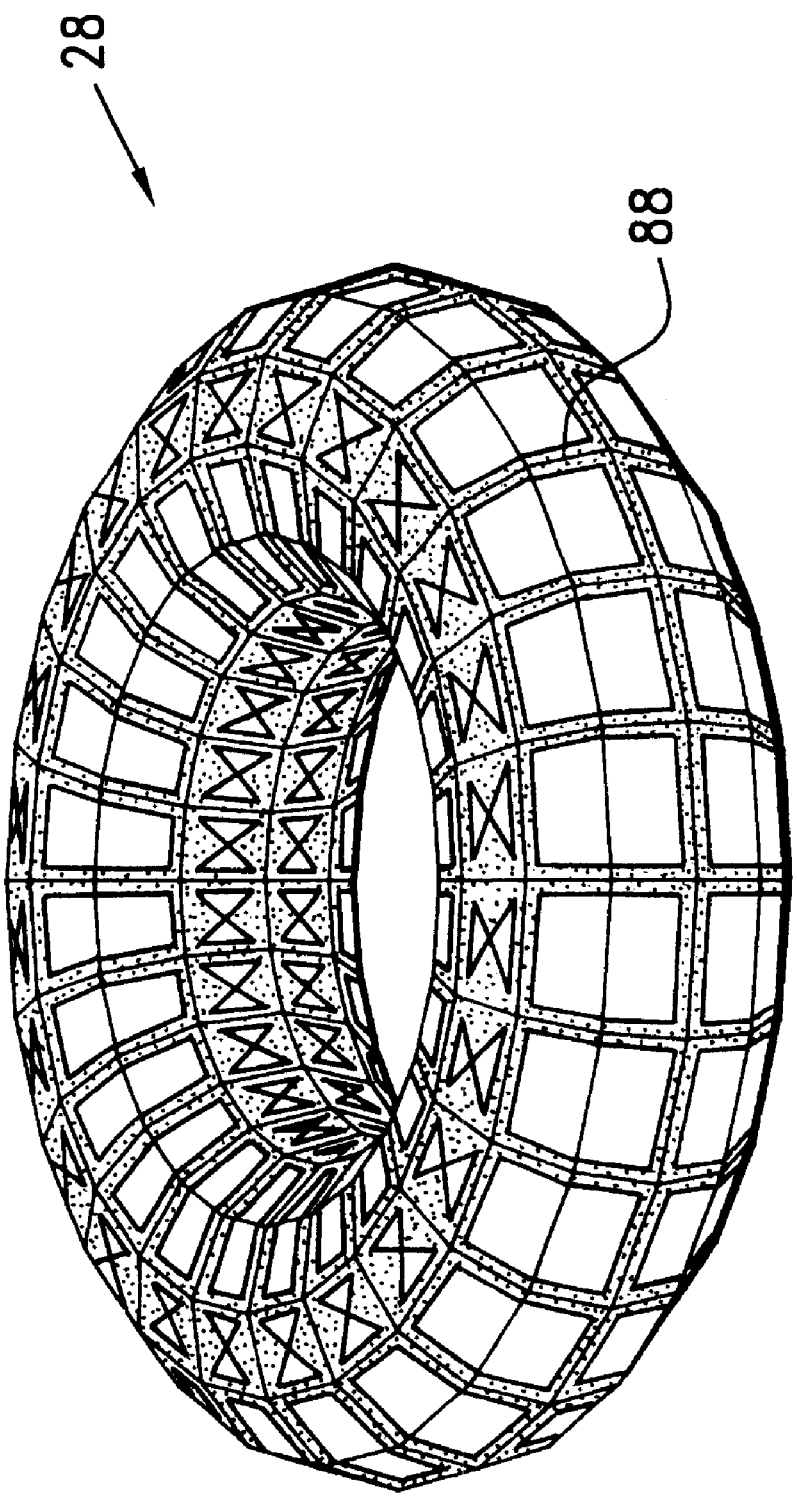
FIG. 14 is a depiction of a torus image generated by the kaleidoscope of FIG. 12.

A third preferred embodiment of a torus image-producing kaleidoscope in accordance with the present invention is shown generally at 80 in FIG. 12. This third preferred embodiment is again structurally very similar to the first and second embodiments described above. As can be seen in FIG. 12, in the third embodiment, a template 82 is interposed on the surface of the object cell 24 within the interior of the reflector assembly 22. The template 82 is arcuate in shape and attaches to the opening of the reflector system, sitting atop the object cell 24. The template 82 is provided with a variety of cut-out portions 84 that can have any number of desired geometric or random shapes. The template surfaces 86 remaining after the cut-out portions 84 have been formed will create opaque lines 88 on the resultant torus image, as is shown in FIG. 14. It is quite possible to form the template or templates 82 out of a semi-transport material so that the lines 88 formed on the torus image 28 will not be completely dark but instead will be of a desired color. Any color and pattern of lines which may be coordinated with the overall theme of the kaleidoscope can be incorporated into the image 28 through the use of a suitable template or templates 82.

Figure 3:
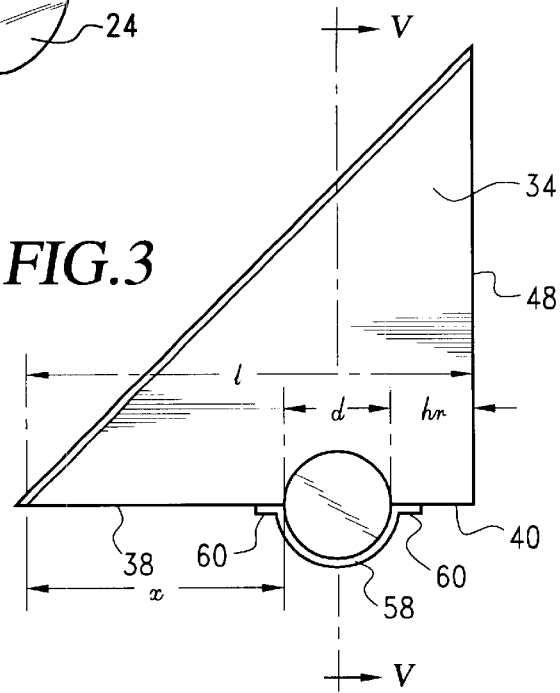
FIG. 3 is a side elevation view of the kaleidoscope of FIG. 2.
Figure 4:
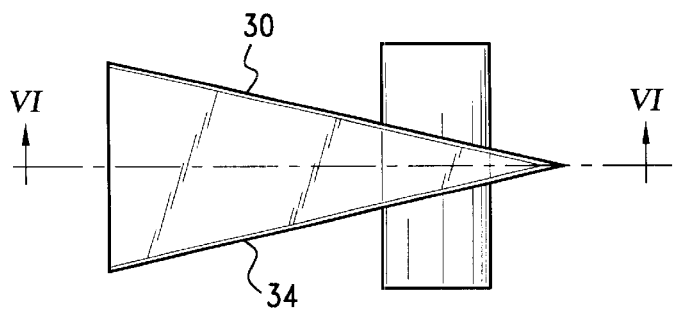
FIG. 4 is a top plan view of the kaleidoscope of FIG. 2.
Figure 5:
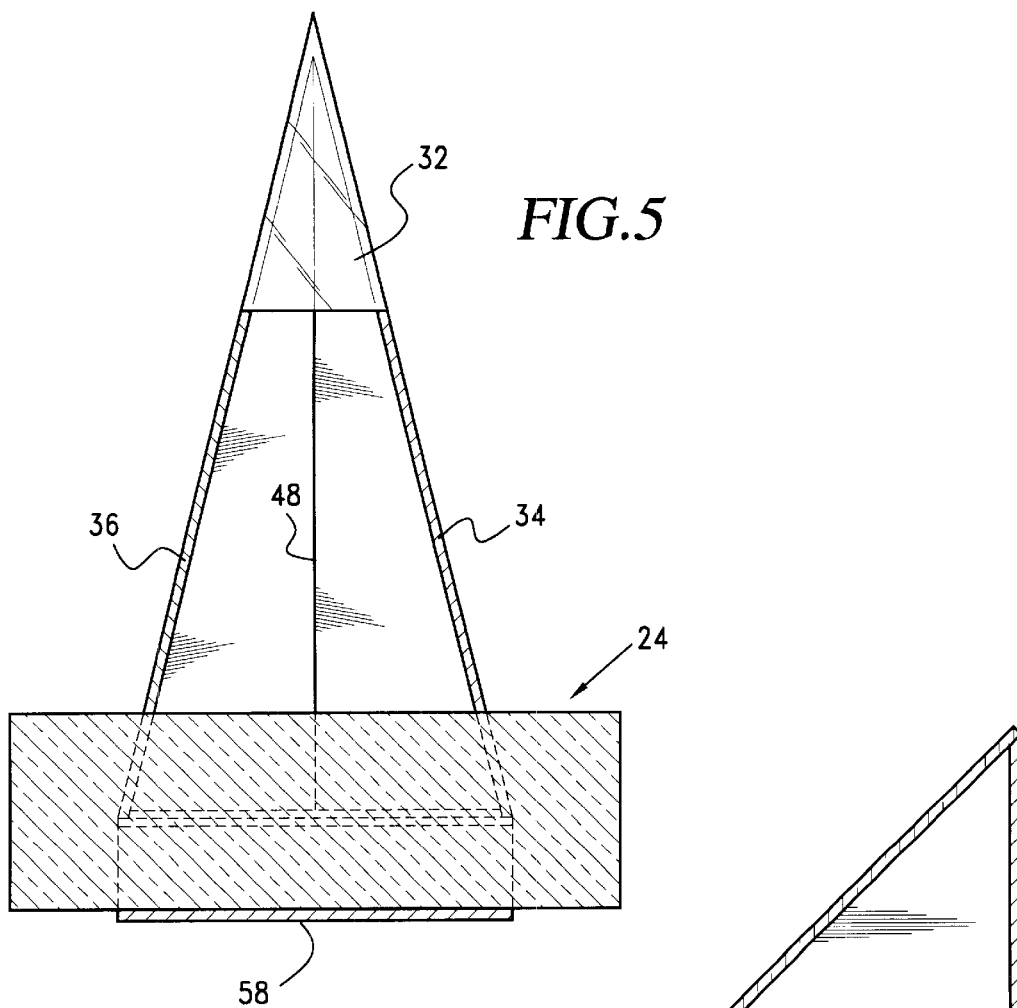
FIG. 5 is a sectional end view of the kaleidoscope taken along line V—V of FIG. 3.
Figure 6:
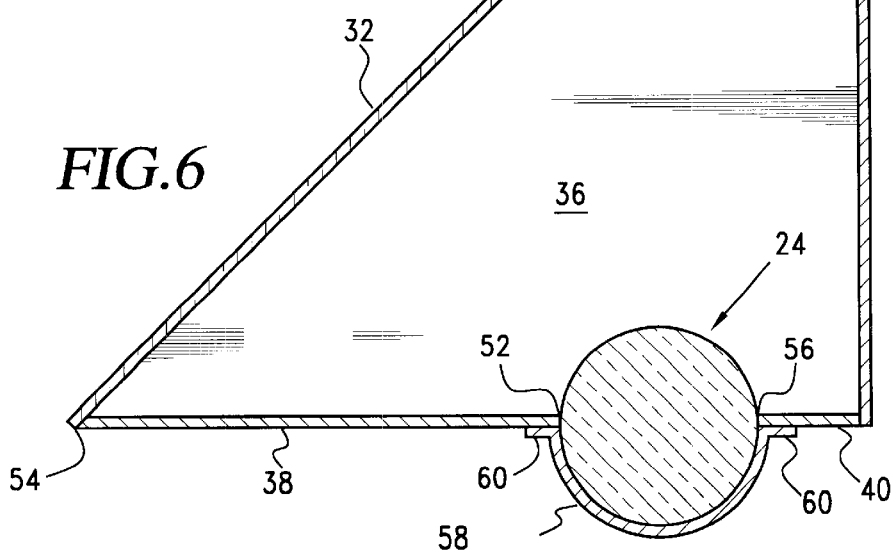
FIG. 6 is a sectional side elevation view of the kaleidoscope of FIG. 2, taken along line VI—VI of FIG. 4.

Referring now to FIG. 13, there may be seen, generally at 90 a fourth preferred embodiment of a torus image-producing kaleidoscope in accordance with the present invention. This fourth preferred embodiment is generally similar to the first embodiment with the exception that several smaller object cells 92 are positioned along the base of the reflector assembly 22. A suitable bracket 94, which has as many semi-cylindrical recesses as there are object cells 92, is used to hold the several object cells 92 in place. Although not specifically shown in FIG. 13, it will be understood that the object cells 92 of the fourth preferred embodiment will also utilize a light source or light sources, as discussed above in connection with FIG. 1. The kaleidoscope depicted in FIG. 13 will be understood as producing concentric torus images, called tori, with as many concentric images being formed as there are object cells 92. The several object cells can be similar in size and color or can be different in either or both size and color. The resultant tori images will be interesting to the viewer. While the invention has been described above as having four preferred embodiments, it will be apparent that aspects of the several embodiments can be combined, as desired. For example, the template 82 of FIG. 12 can be utilized with one or more of the object cells 92 of FIG. 13, if desired. The material wedge 74 of FIGS. 7 and 8 can also be used with the template 82 of FIG. 12 and also with the multiple object cells 92 of FIG. 13. Other combinations and permutations are also possible. One example, but not limited to, of this arrangement is the desire to construct a torus image-producing kaleidoscope whereby the wedge 72 is shaped to create the image of a central sphere, and the multiple tori images created by the object cells 92 create the image of concentric kaleidoscopic tori around the central sphere. This effect reminds one of the arrangement produced by the planet Saturn The size of the torus image 28 generated by the kaleidoscope 20, and its location within the reflector assembly 22 are functions of several of the relative dimensions of the kaleidoscope. A distance x, as seen in FIG. 3 which is the height of the primary bottom reflector 38 or the distance between its minor and major bases 52 and 54, is referred to as the setback distance. As this setback distance is increased, the torus image will appear to be further away from the viewer. This allows a greater field of view for the observer who is viewing the torus image through a viewing aperture 30 in the cover 32. The hole radius is indicated at hr in FIG. 3 and is the same as the height of the isosceles triangle that forms the secondary bottom reflector 40, and defines the size of the hole in the center of the torus image. The diameter of the semi-circular aperture 50, referred to as d in FIG. 3, which is also nearly the diameter of the object cell 24, together with the setback distance x, and the hold radius hr, all add together to provide the total length of the reflector assembly, l, as shown in FIG. 3. As the setback distance x increases, and given a constant diameter of the object cell receiving aperture 50, the distance hr will be reduced for a given overall reflector assembly size. This will result in a torus image that appears further away form the viewer and which has a smaller center. If a relatively thin torus image were desired, with a large diameter center hole, then, given any distance x, d would be relatively a small distance, and hr would be a relatively larger distance. Or, consequently, if a relatively fat torus image were desired with a small diameter center hole, then, given any distance x, d would be relatively a large distance, and hr would be a relatively smaller distance. Clearly, these dimensions must be selected, depending on the desired configuration of the torus image, prior to construction of the reflector assembly.

The torus image produced by the kaleidoscope of the present invention will have surface characteristics defined by the objects in the object cell. If the object cell is rotated, an object in the cell will appear to move in a circular path longitudinally over the surface of the torus image. This movement will be generally such as to appear to cause the torus to kaleidoscopically turn into or out-of itself The image of the object will appear to follow a circular path around the tube of the torus. If the object cell is caused to move axially, the location of a certain object in the object cell will cause the object viewed on the torus image to kaleidoscopically move around the circumference of the surface of the torus in a generally sideways manner. A combined rotational and axial movement of the object cell will result in movement of an image object in a generally diagonal manner on the surface of the toroidal image.

While prefelted embodiments of a torus image-producing kaleidoscope in accordance with the present invention have been set forth fully and completely hereinabove, it will be apparent to one of skill in the art that a number of changes in, for example, the overall size of the kaleidoscope, the exterior housing in which the kaleidoscope can be placed and the like can be made without departing from the true spirit and scope of the present invention which is accordingly to be limited only by the following claims:

What is claimed is:

1. A torus image-producing kaleidoscope comprising:

a generally wedge-shaped reflector assembly including a first side reflector, a second side reflector and a bottom reflector, each of said first, second and bottom reflectors having an inner reflective surface, said reflector assembly defining a reflector assembly interior; and a cylindrical object cell positioned partially within said reflector assembly interior, said cylindrical object cell dividing said bottom reflector into a primary bottom reflector and a secondary bottom reflector, said cylindrical object cell being light transmissive and cooperating with said inner reflective surfaces of said first, second and bottom reflectors to generate a torus image suspended within said reflector assembly interior.

2. The kaleidoscope of claim 1 wherein said first and second side reflectors are right angle triangles .

3. The kaleidoscope of claim 2 wherein each of said first and second right angle triangles include first and second side walls, said second side walls of said first and second right angle triangles engaging each other along a seam edge.

4. The kaleidoscope of claim 3 wherein said first side walls of said first and second right angle triangles each have an aperture located intermediate ends of each of said first side walls.

5. The kaleidoscope of claim 4 wherein said cylindrical object cell is receivable in said apertures in said first side walls of said first and second right angle triangles.

6. The kaleidoscope of claim 3 further including a material wedge in said reflector assembly interior and adjacent said seam edge.

7. The kaleidoscope of claim 1 further including a light source, said light source illuminating said cylindrical object cell.

8. The kaleidoscope of claim 1 further including at least one additional cylindrical object cell positional adjacent, and spaced from said cylindrical object cell partially within said reflector assembly interior.

9. The kaleidoscope of claim 1 further including a cover, said cover cooperating with said first and second side reflectors and said bottom reflectors to define said reflector assembly interior.

10. The kaleidoscope of claim 9 further including at least one viewing aperture in said cover.

11. The kaleidoscope of claim 1 wherein said primary bottom reflector is a trapezoid and further wherein said secondary bottom reflector is an isosceles triangle.

12. The kaleidoscope of claim 1 wherein said cylindrical object cell is a right circular cylinder.

13. The kaleidoscope of claim 1 wherein said cylindrical object cell is positioned partially within said reflector assembly interior for rotational movement about an axis of said cylinder.

14. The kaleidoscope of claim 13 wherein said cylindrical object cell is further supported for axial movement along said axis of said cylinder.

* * * * *